Feb. 15, 1938.  J. A. BROOKS  2,108,099
DEVICE FOR INDICATING DIRECTION OF MOVEMENT
Filed April 4, 1935  2 Sheets-Sheet 1
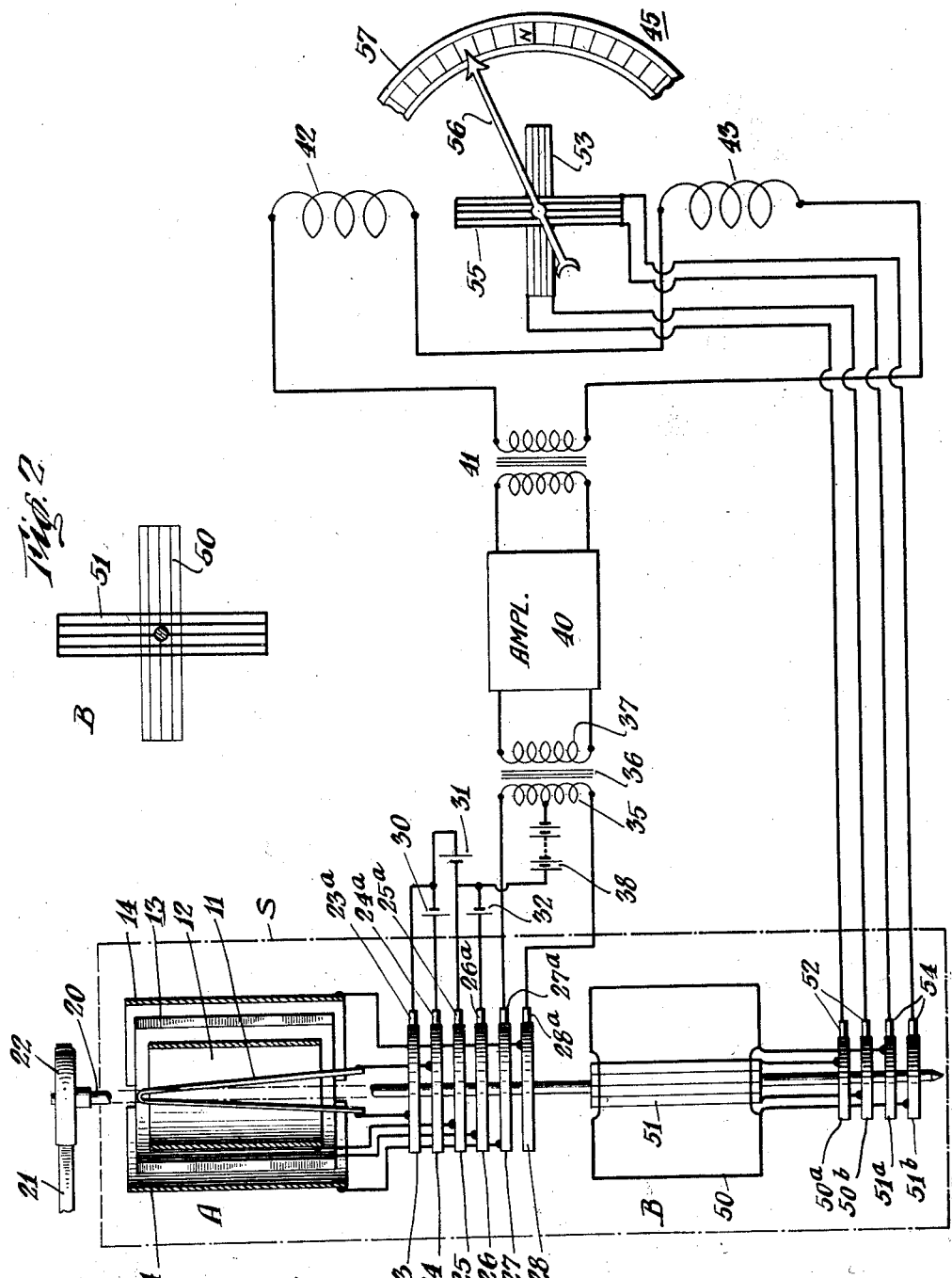
INVENTOR
Josiah A. Brooks
BY
ATTORNEY

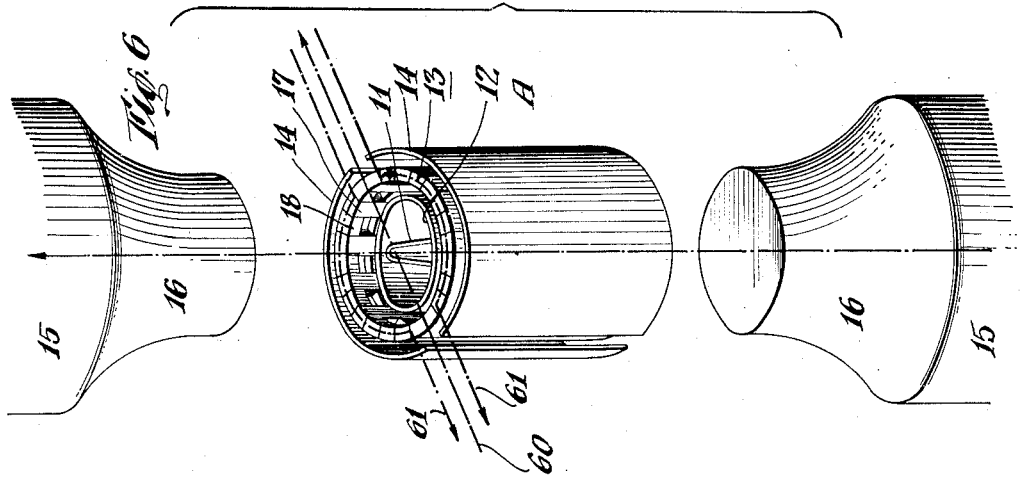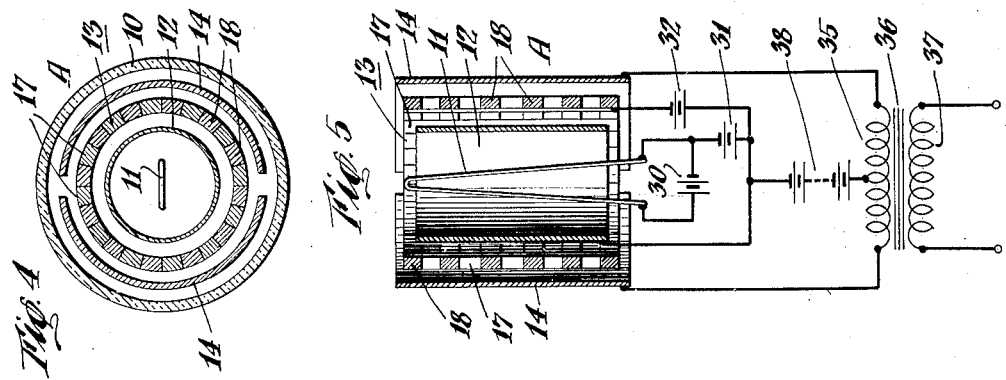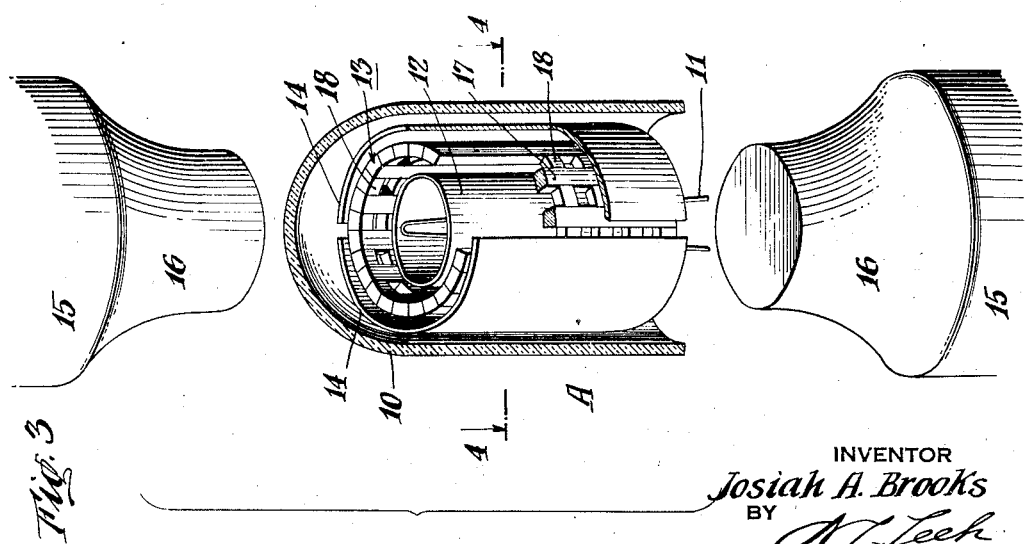

Patented Feb. 15, 1938

2,108,099

UNITED STATES PATENT OFFICE 2,108,099

DEVICE FOR INDICATING DIRECTION OF MOVEMENT

Josiah A. Brooks, Port Washington, N. Y.

Application April 4, 1935, Serial No. 14,564

19 Claims. (Cl. 33—204)

This invention relates to a device for indicating direction of movement and more particularly to a device for indicating the direction of horizontal movement of a craft with respect to the earth's surface. The present application is a continuation in part of my copending application Serial No. 530,608, filed April 16, 1931, for Indication of direction of movement.

An object of the invention is to provide a device capable of indicating true direction of movement regardless of transverse motion or drift of the craft as distinguished from compass course or orientation of the craft with respect to a given direction, such as north.

Another object is to provide a device for indicating the true course of a craft without requiring observations to determine drift.

Another object is to utilize the earth's magnetic field for indicating the direction of movement of the craft with respect to the direction of the magnetic field.

Another object is to provide an efficient, dependable device of the above character.

A feature of the invention consists of the provision of a device adapted to have a potential induced therein due to rectilinear movement through the earth's magnetic field. In one embodiment, the device combines rotary and rectilinear motion in said field to produce an alternating potential having a time phase characteristic which is dependent upon the direction of rectilinear movement.

Another feature consists in the provision of a fixed standard with which the time phase characteristic of the above mentioned potential is compared. This may comprise, for example, a device adapted to generate an alternating potential having a fixed time phase relationship with respect to a given magnetic direction, such as north, and being independent of the direction of rectilinear movement in the earth's magnetic field. The time displacement between the first and second potentials above mentioned indicates the angle of deviation of the rectilinear movement with respect to north.

Another feature of the invention consists in the provision of an indicating device to register the phase displacement between the two potentials so as to indicate the true direction of movement on a scale graduated in degrees of azimuth.

Other features of the invention consist in the various details of construction and combinations of parts hereinafter more fully set forth.

The present invention relies for its operation upon the generation of a voltage by rectilinear movement in the earth's magnetic field. Various difficulties are involved in accomplishing this, partly by reason of the fact that the utilization circuit as well as the generator move in the same field, and, unless precautions are taken, will form a closed circuit in which potentials are generated which exactly balance, thereby preventing any useful effect from being obtained.

The problem is further complicated by the presence of an electrostatic field above the surface of the earth which is variable both as to time and place. A conductor rotating in an electrostatic field has an alternating current set up therein which cannot be distinguished from the current set up by a combination of rotation and rectilinear movement in a coexistent magnetic field unless the nature and the potential gradient of the electrostatic field be known. Inasmuch as the electrostatic field above the earth's surface is continuously varying and the direction of movement of the craft must be determined without knowing the direction or the potential gradient of the electrostatic field at the craft's location, it is obvious that means must be provided for eliminating the disturbing effect of the electrostatic field in order to accomplish the result above specified.

In accordance with the present invention, I overcome the above difficulties by providing a closed circuit having certain parts which are differentially affected by the magnetic field through which the circuit is passing. By this means a differential effect is produced which is capable of producing a useful result in spite of the fact that the utilization circuit is acted upon by the same field as the generator.

The invention further provides for utilizing a generator having an electrostatic shield in which a strong electrostatic field is developed, the field being of such strength that the potential induced in the shield by reason of the earth's magnetic field through which it passes has a negligible effect on the operation thereof.

More specifically, the invention utilizes an electron discharge device which is constructed and operated so as to normally produce an electron stream between elements thereof. Additional forces are exerted on the electrons within this stream by movement of said device through the earth's magnetic field, which forces change the characteristics of the electron stream and produce an effect which becomes evident in the output circuit of the device and may be utilized for the purpose specified. The electron discharge device may be considered to constitute a single phase generator which is actuated by the vertical component of the earth's magnetic field to generate an alternating current having a time phase characteristic dependent upon the direction of rectilinear movement of the device in said field.

A second generator is also provided which is actuated by the horizontal component of the earth's magnetic field to generate a current having a definite time phase characteristic with respect to the direction of said field. The two potentials thus generated are compared in a phase angle indicator which is graduated to indicate the angular deviation of the rectilinear movement with respect to the magnetic north.

The broader aspects of the invention and the manner of its application may be better understood by referring to the embodiment thereof which is more fully disclosed for purposes of illustration in the following description and in the accompanying drawings forming a part thereof, in which Fig. 1 is a diagrammatic representation of a system illustrating one embodiment of the invention;

Fig. 2 is a plan view of the generator which is actuated by the horizontal component of the earth's magnetic field;

Fig. 3 is a perspective view illustrating the essential features of the generator which is actuated by the vertical component of the earth's magnetic field;

Fig. 4 is a section taken on the line 4—4 of Fig. 3;

Fig. 5 is a simplified circuit diagram showing connections to the various parts of the generator of Fig. 3; and Fig. 6 is a perspective view similar to Fig. 3 but illustrating the direction of movement with respect to the earth's field.

In the following description and in the claims, specific terms have been used for convenience in referring to various details. These terms, however, are to be interpreted as broadly as the art will permit.

Referring to the drawings more in detail, the invention is shown in Fig. 1 as applied to a device comprising a generator A which is actuated in response to rectilinear movement through the vertical component of the earth's magnetic field and a generator B which is actuated in response to the horizontal component of the earth's field as a result of rotary movement therein and regardless of rectilinear movement with respect thereto.

The generator A is shown more in detail in Figs. 3 to 6 as comprising a space discharge device 10, such as an electron tube, having a centrally located heater element 11, a cylindrical cathode 12 surrounding said heater element, a cylindrical magnetic grid 13 concentric with said cathode but spaced therefrom, and a pair of oppositely disposed, substantially semi-cylindrical anode plates 14 which are likewise mounted concentrically with the heater 11. The various elements above mentioned are mechanically supported in any convenient manner, not shown, and provision is made for making suitable electrical connections thereto as by means of the usual electron tube base, not shown. The mechanical construction of the electron tube, other than the concentric arrangement of the parts above mentioned, forms no part of the present invention and is accordingly not set forth in detail herein.

A pair of members 15 of magnetic material are disposed in axial alignment with the electron tube elements above mentioned. These magnetic members are preferably provided with pole pieces 16 which may be considerably smaller in diameter than the members 15 whereby the effect of the magnetic field intercepted by the members 15 is concentrated, so that maximum concentration of flux is caused to pass through the electron tube above described.

The magnetic grid 13 comprises a plurality of spaced longitudinal members 17 and segmental members 18 joined thereto to form a grid-like arrangement. The longitudinal members 17 are formed of magnetic material such as iron. The members 18 may be formed of similar material or they may be non-magnetic, particularly if the horizontal component of the earth's field is small as compared to the concentrated vertical component of the field which passes between pole pieces 16.

Referring now to Fig. 1, it is noted that the electron tube generator A is mounted to rotate about a vertical axis as by means of a shaft 20 which is supported in any convenient manner and is rotated by any suitable source of power, such as a belt 21 and pulley 22. For making suitable connections to the various elements of the electron tube, a set of slip rings 23 to 28 are provided which are also mounted for rotation with the shaft 20. Slip rings 23 and 24 are electrically connected to the heater 11 for supplying energizing current thereto. Slip ring 25 is electrically connected to the cathode 12. Slip ring 26 is connected to the magnetic grid 13. Slip rings 27 and 28 are respectively connected to the two semi-cylindrical anode plates 14.

By means of a set of brushes 23a to 28a suitable connections are made from the slip rings 23 to 28 respectively to external circuits. As illustrated in Figs. 1 and 5 these brushes are so connected that a battery 30 supplies energizing current to the heater 11, the cathode 12 is connected to the heater 11 through a battery 31, the magnetic grid 13 is connected to the cathode through a battery 32, and the two anodes 14 are connected across the primary 35 of a push-pull transformer 36, the center tap of said primary 35 being connected to the cathode through a battery 38.

The energy in the secondary 37 of the push-pull transformer 36 may be applied to an amplifier 40 in which it is amplified to any desired extent and may thence be applied through a transformer 41 to series connected coils 42 and 43 of a phase angle indicator 45.

The generator B comprises a pair of coils 50 and 51 which are displaced in phase by 90 degrees and are mounted for rotation with the shaft 20, above mentioned. The coils 50 and 51 constitute a two phase generator which is acted upon by the horizontal component of the earth's magnetic field. The coil 50 is electrically connected to slip rings 50a and 50b and the coil 51 is electrically connected to slip rings 51a and 51b. The slip rings 50a and 50b are connected by brushes 52 to a coil 53 of the phase angle indicator 45. The slip rings 51a and 51b are connected by brushes 54 to a coil 55 of the phase angle indicator 45. The coils 53 and 55 are displaced by 90 degrees so as to correspond with the displacement of coils 50 and 51 and constitute the motivating coils of the phase angle indicator 45. Coils 42 and 43 are oppositely disposed with respect to the coils 53 and 55, the mechanical construction being of the type well-known in phase angle indicators and consequently not set forth in detail herein. A pointer 56 is actuated by the phase angle indicator coils and is adapted to move over a scale 57 which may be graduated to indicate angular degrees of deviation from a base point corresponding to north. It is obvious that amplification may be included in the connections between the coils 50 and 51 and the coils 53 and 55, if desired.

An electrostatic shield S may be provided around the generators A and B if it is desired to shield the device from the effect of stray electrostatic fields.

In the operation of this device, the batteries 30, 31, 32 and 38 are adjusted in accordance with well known electron tube practice to cause the desired electron stream to be emitted from the cathode 12 and to pass to the anode plates 14. These electrons pass through the interstices or apertures in the magnetic grid 13. It is obvious that the potential of the magnetic grid will affect the flow of electrons in the same manner as though the grid were made of non-magnetic material. In this respect the tube operates in accordance with the usual electron tube characteristics.

The vertical component of the earth's magnetic field is concentrated by the pole pieces 16 to provide magnetic lines of force which pass longitudinally through the tube. These lines of force will be concentrated in and pass through the longitudinal magnetic elements 17 of the grid 13 and will have no appreciable effect upon the electron flow which passes through the interstices of the grid and consequently does not cut magnetic lines. In any event, whatever effect the flux may have upon the electron flow will affect both anode plates equally and will accordingly be balanced out and will not appear in the output circuit of transformer 36.

If now the vacuum tube is subjected to rectilinear movement through the earth's magnetic field in the direction of the arrow 60 of Fig. 6, that is, in a plane passing through the axis of the tube and between the two anode plates 14 so that the plates are on opposite sides of said plane, the vertical lines of force between the pole pieces 16 will be caused to move parallel to themselves through the magnetic grid 13 in the directions indicated by the arrows 61 of Fig. 6. The lines of force thus move across the interstices of the grid and accordingly move through the electron streams passing therethrough. The movement of the magnetic field through the electron streams changes the potential gradients along the portions of the electron streams within the range of influence of said field and sets up forces on the electrons which will either assist or retard the flow of electrons, dependent upon the direction of movement and the direction of the field. The thickness of the magnetic grid should be such as to effect the most desirable distribution of the magnetic field for this purpose. If the electron flow is assisted toward one of the plates 14, the flow toward the other plate will be retarded inasmuch as the entire tube is subjected to rectilinear movement and the force will act in the same direction on the electron streams that are emitted toward both plates. This causes an unbalanced condition in the circuit through the primary 35 of the transformer 36 to which the two plates 14 are connected in push-pull relationship.

If now the vacuum tube is rotated about its vertical axis while still retaining the rectilinear movement above mentioned, the difference of potential across the primary 35 becomes an alternating potential having substantially a sine form. The rotation of the tube about its axis in the absence of rectilinear movement will produce no resultant effect upon the output circuit because both of the plate circuits will be affected in the same manner.

It is noted, therefore, that the phase of the alternating voltage produced by the combination of rotary and rectilinear movement of the generator A changes in accordance with the direction of rectilinear movement. This characteristic is utilized in accordance with the present invention to determine the direction of such movement.

The rotation of the coils 50 and 51, constituting the generator B, causes the coils to cut the horizontal component of the earth's magnetic field and to generate a potential having a definite phase determined by the position of the coils on the shaft 20. This potential is not affected by rectilinear movement of the craft by reason of the fact that equal and opposite potentials would be induced in the two sides of the coils by such movement. The potentials induced in the coils 50 and 51 constitute a fixed standard inasmuch as their phase is constant and provide a basis against which the phase of the alternating potential produced by the generator A can be compared.

In the embodiment shown, the alternating potential induced in the coils 50 and 51 is applied to coils 53 and 55 of the phase angle indicator 45 and the alternating potential produced by the electron tube generator A, after amplification, is applied to the coils 42 and 43 of said indicator. Generator B is shown as having two phases inasmuch as a two phase current produces certain advantages in a phase angle indicator and facilitates the accurate calibration thereof. It is obvious, however, that any other desired number of phases could be employed.

Considering the operation of the device as a whole, when the craft is moving through the magnetic field in a given direction polyphase current will be induced in generator B which has a fixed time phase characteristic dependent solely upon the angular position of coils 50 and 51 upon the shaft 20. An alternating potential is also induced in the generator A, which has a time phase characteristic dependent upon the physical position of the vacuum tube with respect to the shaft 20 and upon the direction of rectilinear movement of the craft through the earth's field. The relative phase displacement of these two potentials, corrected for the constants of the circuits, is equal to the angular deviation of the line of movement of the craft from a given magnetic direction, such as north. The indicator 57 is accordingly calibrated to show the phase displacement between the above mentioned potentials in terms of angular deviation from north.

It is noted that in the above device, the effect on the electron streams of the earth's electrostatic field is substantially eliminated inasmuch as the anode plates 14 act as an electrostatic shield therefor.

An electrostatic shield S may be provided if necessary to eliminate any disturbing alternating currents which may be set up in the external plate circuits due to rotation of the anodes 14 in a stray electrostatic field.

The effect of the earth's magnetic field in setting up forces on electrons in the electron streams by reason of rectilinear movement, is applied to particular parts of the circuit at points where it can produce the greatest effect, for example, near the cathode. It is well known that in a conventional three element vacuum tube a minute change in grid potential produces a great change in the output current. The magnetic grid 13 is located near the cathode at a point where the effect of the electron stream is the maximum and any force that is applied to the electron stream at this point, as by reason of the lines of the earth's magnetic field passing through the electron stream, produces a greatly magnified effect in the response of the plate circuit. While other parts of the apparatus may be affected by the same magnetic field due to the rectilinear movement of the craft, yet a residual effect is produced by reason of the much greater response of the electron tube to the forces set up therein as compared to the response produced in the remainder of the circuit. The invention accordingly provides a generator which is capable of producing an alternating potential in response to rectilinear movement in the earth's field, which is not affected by the earth's electrostatic field and which is not nullified by forces produced in the remainder of the circuit.

The vacuum tube is referred to as a generator inasmuch as the useful potential constitutes the difference in voltage generated in response to the rectilinear movement and appearing in the output of the transformer 36. It is to be understood, however, that this term is used in its broad sense.

Although one embodiment of the invention has been shown and described in detail, it is obvious that various changes and modifications may be made therein and that the invention may be embodied in various mechanical constructions without departing from the scope of the invention which is to be limited only in accordance with the following claims when interpreted in view of the prior art.

What is claimed is:

1. The method of determining the direction of rectilinear movement in a given plane cutting a magnetic field at an angle such that said field can be resolved into a component lying in said plane and a component normal to said plane, which comprises utilizing one of said components to generate an alternating voltage having a definite time phase relationship with respect thereto, utilizing the other of said components to generate an alternating voltage having a time phase characteristic dependent upon the actual direction of rectilinear movement in said plane, and determining the phase displacement between said voltages.

2. The method of determining the direction of horizontal movement with respect to the earth's magnetic field which comprises utilizing the horizontal component of said field to generate an alternating voltage having a definite time phase relationship with respect to said field, utilizing the vertical component of said field to generate an alternating voltage having a time phase relationship with respect to said first voltage dependent upon the actual direction of horizontal movement and determining the phase displacement between said voltages.

3. The method of determining direction of movement in a plane intersecting a magnetic field with respect to the direction of that component of the field contained in said plane which comprises generating by means of the component of said field lying in a plane normal to said first plane and by combining rotational movement with rectilinear movement in said first plane, an alternating voltage having a time phase characteristic dependent upon the actual direction of said rectilinear movement, and generating by means of said first component of said field a second alternating voltage having definite time phase relationship with respect to the direction of the first component and measuring the time phase displacement between said voltages.

4. The method of producing a usable effect by rectilinear movement through a uniform magnetic field which comprises causing an electron stream to move laterally of itself through said field and thereby cut the lines of force of the field to produce forces which retard or increase the electron flow in said stream, and utilizing such variation in electron flow to measure a characteristic of the rectilinear movement.

5. The method of producing a usable effect by rectilinear movement through a uniform magnetic field which comprises causing an electron stream to move laterally of itself through said field and thereby cut the lines of force of the field to produce forces which retard or increase the electron flow in said stream, and utilizing such variation in electron flow to determine the direction of the rectilinear movement.

6. The method of measuring rectilinear movement through a uniform magnetic field which comprises cutting said field by a closed circuit containing as an element an electron stream so that forces are set up by the rectilinear movement which change a characteristic of the electron flow, rotating the electron stream about an axis such that the direction of such forces with respect to the electron stream is alternated whereby an alternating potential component is produced which causes an alternating current to flow in said circuit and utilizing such current to measure a characteristic of the rectilinear movement.

7. The method of measuring rectilinear movement through a uniform magnetic field which comprises cutting said field by a closed circuit containing as an element an electron stream so that forces are set up by the rectilinear movement which change a characteristic of the electron flow, rotating the electron stream about an axis such that the direction of such forces with respect to the electron stream is alternated whereby an alternating potential component is produced having a time phase characteristic dependent upon the direction of said rectilinear movement, which component causes an alternating current to flow in said circuit, and utilizing said alternating current to measure the direction of said rectilinear movement.

8. The method of measuring rectilinear movement through a uniform magnetic field which comprises producing a pair of electron streams in which the electrons are emitted in opposite directions from a central cathode, and, by combining rotary movement of said streams about the axis of the cathode with rectilinear movement in said field in a direction transverse to said axis, producing an alternating potential effect the characteristics of which are dependent upon a function of the rectilinear movement, while the effects of the rotary movement with respect to the field are nullified.

9. The method of measuring rectilinear movement through a uniform magnetic field which comprises producing a pair of electron streams in which the electrons are emitted in opposite directions from a central cathode, and, by combining rotary movement of said streams about the axis of the cathode with rectilinear movement in said field in a direction transverse to said axis, producing an alternating potential effect the time phase characteristics of which are dependent upon the direction of said rectilinear movement, while the effects of the rotary movement with respect to the field are nullified.

10. A device for determining direction of movement of an object through a magnetic field which comprises a generator moving with the object and adapted to generate a current having a characteristic bearing definite relationship to a given direction, another generator moving with the object and having means responsive to rectilinear movement through said field to generate a current the corresponding characteristic of which bears a definite relationship to the direction of said movement relative to the magnetic field, means for collecting the currents generated by the two generators, and means for comparing the above mentioned characteristics of these two currents to thereby indicate the direction of movement with respect to the given direction.

11. A device for determining direction of movement of an object through the earth's magnetic field comprising two generators mounted on a single rotating shaft approximately perpendicular to the earth's surface, one of said generators being adapted to generate a current the time phase displacement of which bears a definite relation to the magnetic north direction, the other generator having means responsive to rectilinear movement through said field to generate a current bearing definite relation to the direction of said movement, and means for comparing the time phase displacement of said currents to thereby determine the direction of horizontal movement with respect to magnetic north.

12. A device for determining the direction of horizontal movement of a body with respect to the earth's magnetic field comprising a pair of generating means utilizing the horizontal and vertical components respectively of the earth's field to generate alternating voltages and means for comparing the phase relationship of said voltages.

13. A device for determining the direction of rectilinear movement of a craft with respect to the earth's surface, which comprises an electron tube generator mounted for rotation about a vertical axis, means for rotating said tube about said axis which rotation, combined with rectilinear movement of said tube in the earth's magnetic field as the craft moves over the earth, produces an alternating potential by the effect of the earth's field on the electron stream, said alternating potential having a time phase characteristic which is dependent upon the direction of said rectilinear movement with respect to the direction of the earth's field.

14. A device for determining the direction of rectilinear movement of a craft with respect to the earth's surface, which comprises an electron tube generator mounted for rotation about a vertical axis, means for rotating said tube about said axis which rotation, combined with rectilinear movement of said tube in the earth's magnetic field as the craft moves over the earth, produces an alternating potential by the effect of the earth's field on the electron stream, said alternating potential having a time phase characteristic which is dependent upon the direction of said rectilinear movement with respect to the direction of the earth's field, a second generator having means affected only by the horizontal component of the earth's field to generate a potential having a time phase characteristic dependent only upon the direction of the earth's field, a phase angle indicator calibrated to indicate deviation with respect to north and means of applying both of said potentials thereto.

15. A device for determining the direction of rectilinear movement of a craft with respect to the earth's surface, which comprises an electron tube generator mounted for rotation about a vertical axis and having concentrically positioned anode, cathode and control grid, means for rotating said tube about said axis which rotation, combined with rectilinear movement of said tube in the earth's magnetic field as the craft moves over the earth, produces an alternating potential by the effect of the earth's field on the electron stream, said alternating potential having a time phase characteristic which is dependent upon the direction of said rectilinear movement with respect to the direction of the earth's field.

16. A device for determining the direction of rectilinear movement of a craft with respect to the earth's surface, which comprises an electron tube generator having an anode, cathode and control grid, said grid being of magnetic material and having interstices through which the electrons pass, said grid being disposed so that rectilinear movement of said tube in the earth's magnetic field causes the magnetic flux to pass through the electron stream and to set up forces which influence the electron flow.

17. A device of the class described comprising an electron discharge tube having a cathode, an anode and a control grid of magnetic material disposed therebetween, said grid comprising longitudinal members of magnetic material and horizontal spacing members forming an open grid having interstices through which the electrons pass.

18. A device of the class described comprising an electron discharge tube having concentric, cylindrical cathode and control grid, a pair of substantially semi-cylindrical anodes disposed concentrically therewith and on opposite sides of the tube, said control grid having axial magnetic members and segmental spacing members to form an open grid having interstices through which the electrons pass.

19. A device for determining the direction of rectilinear movement of a craft with respect to the earth's surface, which comprises an electron tube having a central cathode, oppositely disposed anodes and an interposed grid of magnetic material, a translating device including a circuit in which the anodes are connected in push pull relationship, means to rotate the tube about the axis of its cathode in a magnetic field to produce forces which are balanced out by the push-pull connection of the anodes, the rectilinear movement of said tube in said field as the craft moves over the earth, combined with said rotational movement producing an alternating current in the anode circuit which is capable of actuating said translating device.

JOSIAH A. BROOKS.